United States Patent [19]

Adamic, Jr.

[11] Patent Number: 4,945,762

[45] Date of Patent: Aug. 7, 1990

[54] SILICON SENSOR WITH TRIMMABLE WHEATSTONE BRIDGE

[75] Inventor: Fred W. Adamic, Jr., Sunnyvale, Calif.

[73] Assignee: SenSym, Inc., Sunnyvale, Calif.

[21] Appl. No.: 301,403

[22] Filed: Jan. 24, 1989

[51] Int. Cl.$^5$ ............................. G01L 1/22; G01L 9/06
[52] U.S. Cl. .................................. 73/862.67; 73/727; 73/765
[58] Field of Search ...................... 73/862.67, 765, 766, 73/777, 727; 357/61

[56] References Cited

U.S. PATENT DOCUMENTS

| | | | |
|---|---|---|---|
| 4,606,781 | 8/1986 | Vyne | 357/51 X |
| 4,622,856 | 11/1986 | Binder et al. | 73/727 |
| 4,672,853 | 6/1987 | Hickox | 73/708 |
| 4,713,680 | 12/1987 | Davis et al. | 357/51 |
| 4,725,791 | 2/1988 | Susak et al. | 357/51 X |

Primary Examiner—Charles A. Ruehl
Attorney, Agent, or Firm—Skjerven, Morrill, MacPherson, Franklin & Friel

[57] ABSTRACT

A device and method for trimming diffused or implanted resistors incorporated within a silicon sensor. Current pulses are applied to cause the migration of aluminum contacts in silicon, resulting in controllable incremental reductions in resistor value. The resistors are symmetrically positioned within a Wheatstone bridge to correct offset voltage and sensitvity erros that result from manufacturing tolerances.

16 Claims, 4 Drawing Sheets

SILICON SENSOR WITH TRIMMABLE WHEATSTONE BRIDGE

BACKGROUND OF THE INVENTION

1. Field of the Invention

This invention relates to silicon sensors such as pressure sensors and accelerometers which include resistors having a resistance value that varies with the applied force, and which are made by semiconductor processes.

2. Description of the Prior Art

Silicon pressure sensors and accelerometers generally use a diffused or implanted Wheatstone bridge to convert applied force to an electrical signal. Sometimes such sensors use a half bridge, with half the sensitivity. The resistors of the bridge form a network and are positioned on a thin silicon diaphragm in such a way that their values change in opposite directions with force applied to the diaphragm, thus creating a resistance that results in a usable output signal in response to an applied voltage. FIG. 1 shows an example of a prior art silicon sensor with four resistors R1−, R2+, R3−, R4+ with arrows 8-1, 8-2, 8-3, and 8-4 that show the direction of resistor value change with force applied from above. "Up" arrows 8-1 and 8-3 indicate that resistors R2+ and R4+ increase resistance with applied force; "down" arrows 8-2 and 8-4 indicate that resistors R1− and R3− decrease resistance with applied force. In FIG. 1, the four resistors R1−, R2+, R3− and R4+ are located on silicon diaphragm 10 which is part of silicon chip 12. FIG. 2 shows schematically how these same four resistors R1−, R2+, R3−, R4+ would be arranged in a prior art Wheatstone bridge to maximize the useful output voltage $[(V_{out}+)-(V_{out}-)]$ resulting from an applied force. V+ represents a supply voltage to ground (GND). For the Wheatstone bridge, all four resistors R1−, R2+, R3−, and R4+ have the same resistance in the absence of an applied force. Note that for R1− and R3−, a force applied to silicon diaphragm 10 lessens the resistance; for R2+ and R4+, such a force increases resistance, as shown by the direction of the arrows through the resistor symbols.

An ideal sensor device of the type shown in FIG. 1 would have a zero differential output voltage $[(V_{out}+)-(V_{out}-)]$ with no force applied, a specified differential output voltage response per unit applied force, and both features would not change over the operating temperature range. The prior art technology approximates the ideal device by adding resistor networks in series and in parallel with the basic four resistor bridge device. This network is then laser trimmed to achieve a satisfactory performance compromise. The added resistor networks can be thick or thin film resistors connected to the sensor, or thin film resistors can be fabricated on the sensor chip. The laser trim approach adds to processing costs for the film depositions and patterning, and laser trimmers are expensive and costly to maintain. In addition, the trimming must be done before final assembly of the package; thus stresses induced by final assembly can undo the work of the laser trimmer.

It would therefore be advantageous to be able to trim a sensor after assembly and to do so without the additional costs associated with laser trimming.

Other known methods to trim resistors include Zener diode "zapping" and fuse blowing. Both have many of the same disadvantages as does laser trimming.

Vyne, in U.S. Pat. No. 4,606,781, issued Aug. 19, 1986, discloses another method for trimming an electrical component that is located within an integrated circuit and, more particularly, to a method for trimming implanted or diffused resistors by the use of metal migration. A resistor is constructed as part of an integrated circuit by implanting or diffusing dopants into a semiconductor material through apertures in a masking material. The two electrical contacts to the resistor required to allow electrical current to flow through the resistor are formed by first depositing an insulating layer over the resistor region. Then two openings, called preohmics, are etched into the insulating layer, one at each end of the resistor. A layer of metal is deposited over the insulating layer and into the two preohmics, thus making contact with the two ends of the resistor. The layer of metal is selectively etched to leave two regions of metal, one region overlapping each preohmic. The shape of each preohmic defines the shape of the metal contact.

Pulsating a direct current through the metal contacts of the diffused resistor results in a metal filament controllably migrating from the positive contact to the negative contact. As the metal migrates through the silicon, the value of the resistor changes, decreasing as the metal filament approaches the negative contact. A contact with a sharp corner (such as a contact with a rectangular shape in the plane of the surface of the sensor) or a corner with a small radius of curvature will allow the metal to migrate with less current than, for example, a circular shaped contact with a large radius.

A resistor is trimmed (i.e., the resistance of the resistor is adjusted downwards) by this method to a given value by adjusting the duration and amount of current passing through it as well as by adjusting the number of current pulses. See Vyne, supra, at col. 4, lines 1-18. It is possible to completely short the resistor by pulsing the current for an extended length of time.

SUMMARY OF THE INVENTION

In accordance with the present invention a silicon sensor including a Wheatstone bridge with resistive elements is fabricated by semiconductor methods.

The resistances of the resistive elements of the bridge are adjusted by current pulses applied to trim resistors of the type disclosed by Vyne, supra, which are positioned within the Wheatstone bridge.

Use of trim resistors the resistances of which can be adjusted by current pulses permits trimming of the Wheatstone bridge after assembly of the sensor semiconductor into its package. Thus, the problems and costs associated with laser trimming or zener diode "zapping" or fuse blowing are avoided.

The present invention thus includes trim resistors that can be trimmed by current pulses causing metal migration. Steering diodes are provided to steer the current pulses around the actual Wheatstone bridge resistors during the trimming process.

Important features of the invention include:

1. Using the same structure for bridge and trim resistors, thus maintaining thermal coefficient matching after trim.

2. The use of current steering diodes and trim resistors, allowing trimming of both offset voltage and sensitivity after assembly.

3. The use of <100> orientation silicon substrate material in combination with aluminum metallization and P type trim resistors.

BRIEF DESCRIPTION OF THE DRAWINGS

Identical reference numbers in different figures refer to the same or similar structures.

DETAILED DESCRIPTION OF THE INVENTION

Figure 1:
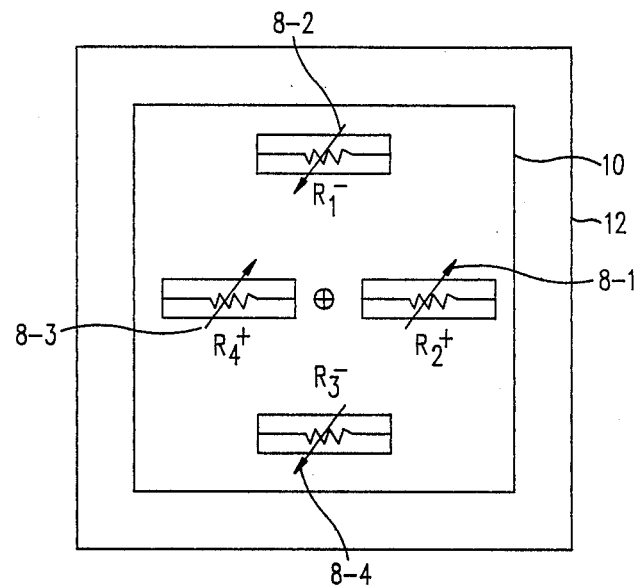
FIG. 1 shows a typical prior art silicon sensor.
Figure 2:
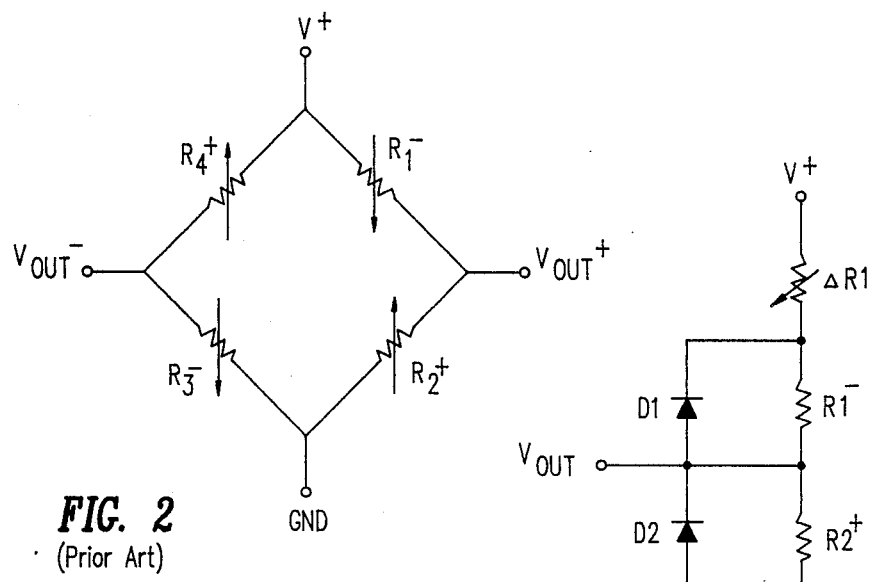
FIG. 2 snows a prior art Wheatstone bridge in schematic form.
Figure 3B:
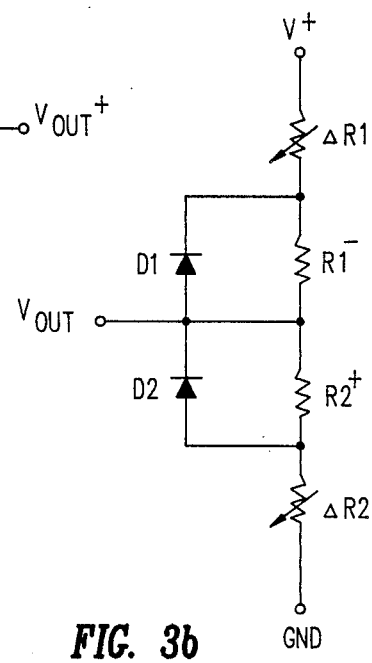
FIG. 3B shows an alternate embodiment of the present invention in schematic form.
Figure 3A:
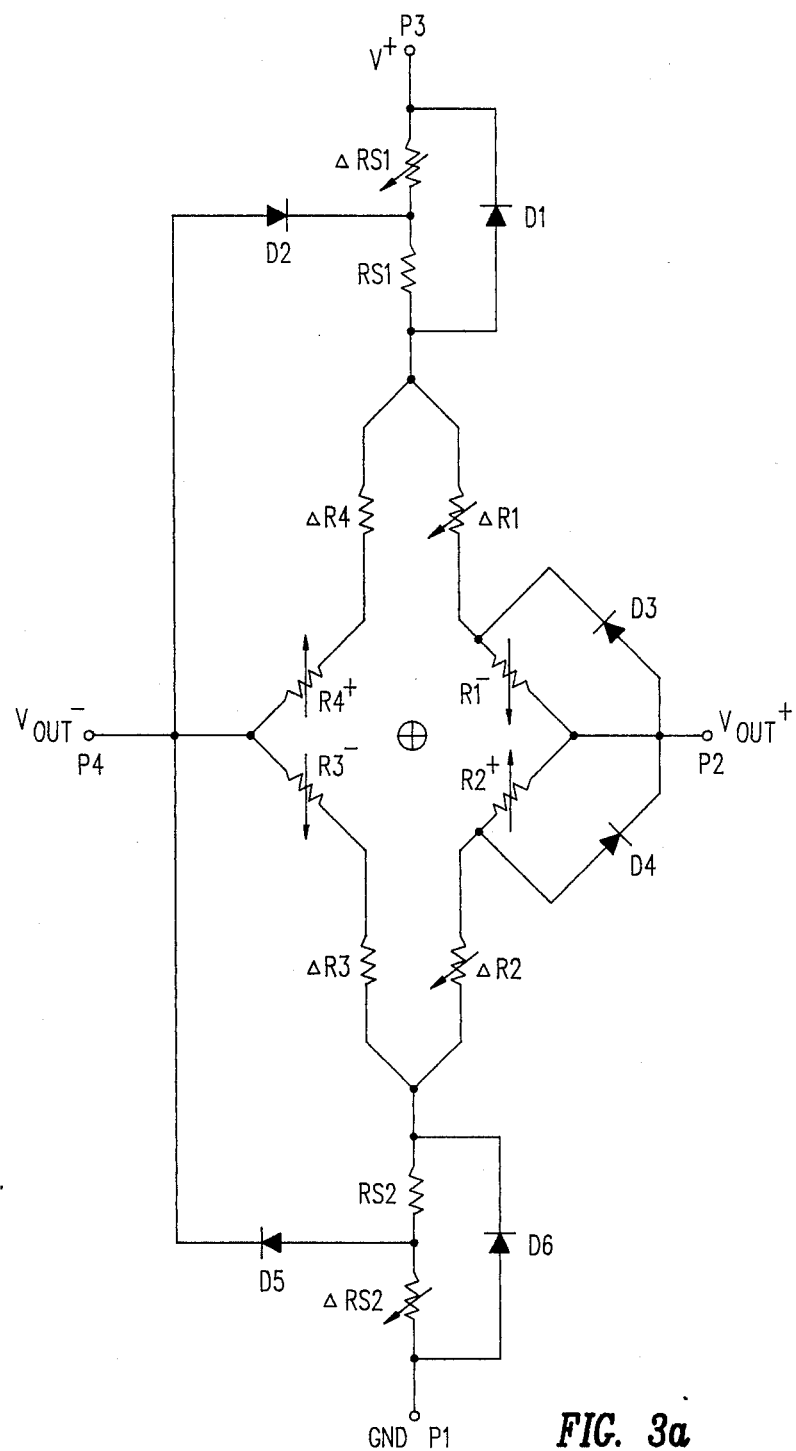
FIG. 3A shows an embodiment of the present invention in schematic form.

The preferred embodiment of the present invention is depicted schematically in FIG. 3A which shows an arrangement of trim resistors and diodes added to a sensor Wheatstone bridge, thus allowing trimming after assembly with high-current pulses applied while biasing the device in a nonstandard configuration.

Shown in FIG. 3A are: voltage terminals (pins) P1, P2, P3 and P4; Wheatstone bridge resistors R1−, R2+, R3−, and R4+; steering diodes D1, D2, D3, D4, D5, and D6; trim resistors ΔR1, ΔR2, ΔRS1, and ΔRS2; balance resistors ΔR3 and ΔR4; and current limiting resistors RS1 and RS2. During normal operation of the silicon sensor, the diodes D1, D2, D3, D4, D5 and D6 are reverse biased and do not conduct. Separately forward biased for trimming, the diodes allow large currents to flow through the trim resistors ΔR1, ΔR2, ΔRS1, and ΔRS2, creating sufficient heat to cause the aluminum contact metal in the trim resistors to migrate along the trim resistor, between the silicon and silicon dioxide, thus reducing the effective length of the trim resistor and thus reducing the resistance value of the trim resistor.

In order to trim the sensor (i.e., adjust it so it has the characteristics of the ideal device referred to above), first, offset voltage is corrected. Offset voltage is the undesirable characteristic referred to above whereby the differential output voltage of the sensor [$(V_{out}+) - (V_{out}-)$] is not equal to zero when no force is applied. This is accomplished first by trimming offset voltage trim resistor ΔR1 by applying a positive varying voltage to terminal P2 while grounding terminal P3 (see FIG. 3A). This both forward biases diode D3, which steers the current around bridge resistor R1− and causes high current pulses to pass through the trim resistor ΔR1, and forward biases diode D1 which steers the current around resistors RS1 and ΔRS1. Second, the second offset voltage trim resistor, ΔR2, is trimmed by applying a positive varying voltage to terminal P1 while grounding terminal P2. This both forward biases diode D4 which steers the current around bridge resistor R3+ and causes high current pulses to pass through trim resistor ΔR2, and forward biases diode D6 which steers the current around resistors RS2 and ΔRS2.

Balancing resistors ΔR3 and ΔR4 are for the purpose of balancing the bridge and are identical to trim resistors ΔR1 and ΔR2. Balancing resistors ΔR3 and ΔR4 need not be trimmable since full trimming of offset voltage and sensitivity can be accomplished without trimming resistors ΔR3 and ΔR4.

Third, sensitivity of the sensor is corrected. Sensitivity, as described above, is the ability of the sensor to provide a specified differential output voltage per unit of applied force. This is accomplished first by trimming sensitivity trim resistor ΔRS1 by applying a positive varying voltage to terminal P4 while grounding terminal P3. This both forward biases diode D2 which steers the current around bridge resistor R4+ and causes high current pulses to pass through trim resistor ΔRS1.

Fourth, sensitivity trim resistor ΔRS2 is trimmed by applying a positive varying voltage to terminal P1 while grounding terminal P4. This both forward biases diode D5 which steers the current around bridge resistor R3− and causes high current pulses to pass through trim resistor ΔRS2.

Resistors RS1 and RS2 limit the current through respectively diodes D1 and D6 and need not be trimmable. The relatively large value bridge resistors R1−, R2+, R3−, R4+ also limit current to protect the other trim resistors. The voltages applied to trim each trim resistor typically must be sufficient to create a current of 250 to 650 milliamps through the trim resistor, depending on the trim resistor characteristics.

Figure 4:
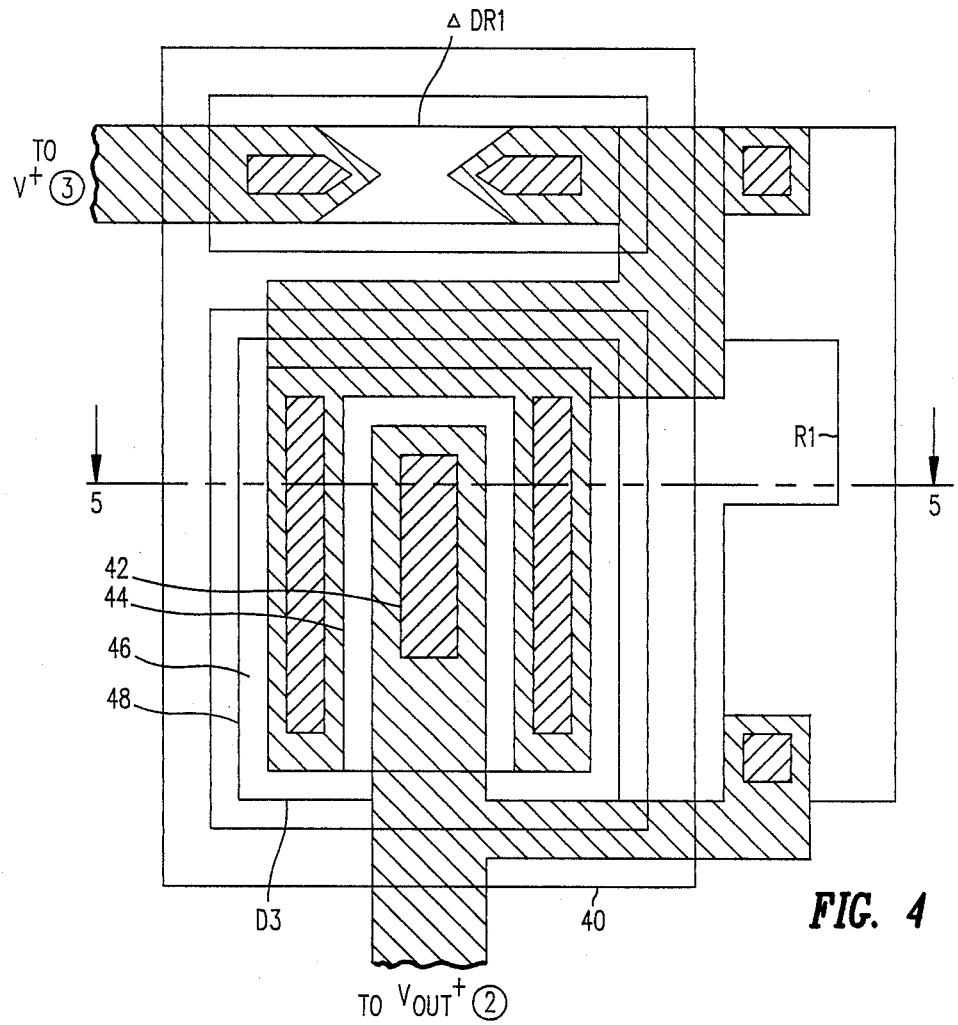
FIG. 4 shows a partial top view of the structure of the preferred embodiment of the present invention.

To understand how the device is trimmed in more detail refer to FIG. 3A and to FIG. 4. Note that the output lead of ΔR1 in FIG. 4 is shown going to terminal P3; alternatively the output lead of ΔR1 is in parallel or in series with other elements as shown in FIG. 3A. In any case, the connection of ΔR1 to terminal P3 directly or through a low resistance diode or switch is necessary.

To trim offset voltage, (see FIG. 3A) a known voltage or current is applied between terminal P3 and ground terminal P1, and the differential voltage between terminal P2 and terminal P4 is determined. With some sensors such as absolute pressure sensors which have an internal vacuum reference as is known in the art, it is necessary to also apply differentials of the characteristic to be measured, then to calculate the offset voltage. Depending on the polarity of the offset voltage, ΔR1 or ΔR2 are targeted for value reduction to reduce the offset. To trim ΔR1, terminal P3 is grounded and current pulses, which have been determined by characterization and programmed into the test system, are forced into terminal P2 to reduce the value of ΔR1. The offset voltage is measured again to verify that the targeted change was accomplished; if not, additional trimming operations are done including switching to ΔR2 to trim ΔR2 if ΔR1 has been overtrimmed (i.e., its resistance decreased below the targeted level).

To trim sensitivity, a known voltage or current is applied between V+ terminal P3 and ground terminal P1, and the offset voltage is measured as above, and differentials of the characteristics to be measured (e.g. pressure, acceleration) are applied while measuring the output voltage. The sensitivity is calculated from these measurements and the amount of trim required of ΔRS1 and ΔRS2 calculated by the computer test system based on characterization data. Both ΔRS1 and ΔRS2 are trimmed to maintain the balance of the bridge (i.e. to keep the common mode output voltage at ½ V+). To trim ΔRS1, terminal P3 is grounded and current pulses are applied to terminal P4. To trim ΔRS2, terminal P4 is grounded and current pulses are applied to terminal P1.

An alternate embodiment of the present invention with a half bridge is shown in FIG. 3B. A half bridge has half the sensitivity of a full Wheatstone bridge. FIG. 3B shows bridge resistors R1−, R2+; trim resistors ΔR1, ΔR2, steering diodes D1, D2 and voltage terminals V+, GND, and $V_{out}$. In the half bridge, trim resistor ΔR1 is trimmed by applying a positive varying voltage to the $V_{out}$ terminal while grounding the V+ terminal. Trim resistor ΔR2 is trimmed by applying a positive varying voltage to the GND terminal while grounding the $V_{out}$ terminal.

Figure 3C:
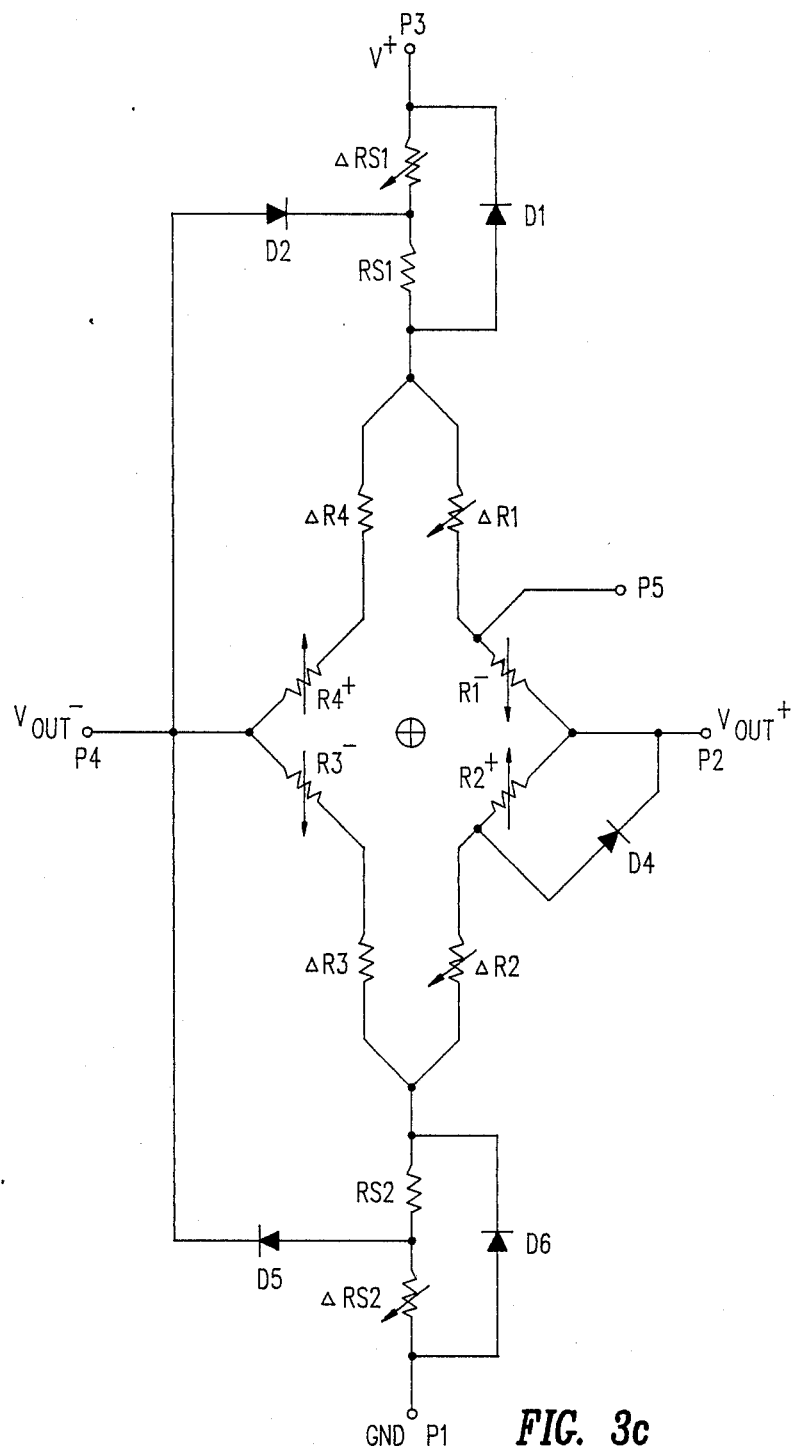
FIG. 3C shows another alternate embodiment of the present invention in schematic form.

In another embodiment (see FIG. 3C), some or all of the steering diodes (such as D3) are omitted, and instead additional voltage terminal pins (such as pin P5) provided so as to apply the trimming current pulses directly to each trim resistor such as ΔR1 by applying a voltage to terminal P5 while grounding terminal P3.

The silicon pressure sensor chip of the present invention in the preferred embodiment, as partially shown in top view in FIG. 4, is formed by conventional semiconductor and silicon sensor processing technology as described above.

FIG. 4 shows a trim resistor such as ΔR1 which connects to V+ terminal P3, a bridge resistor such as R1, a diode such as D3 which connects to $V_{out}$+ terminal P2, and N+ guard ring 40 which suppresses any parasitic lateral transistor action between a diode such as D3 and adjacent structures. Guard ring 40 is included in the preferred embodiment of the invention. The design of a diode such as D3 as shown minimizes internal lateral resistance between the P type diode contact 42 and the edge 44 of the adjacent N+/P junction, and also places a high resistance N+/P pinch resistor 46 (see FIG. 5) between the P type contact 42 (see FIG. 4) and the outside lateral edge 48 of the P type diffusion to further reduce the possibility of parasitic lateral action. The dark shaded areas indicate the electrical metallization contacts to the above described devices.

Figure 5:
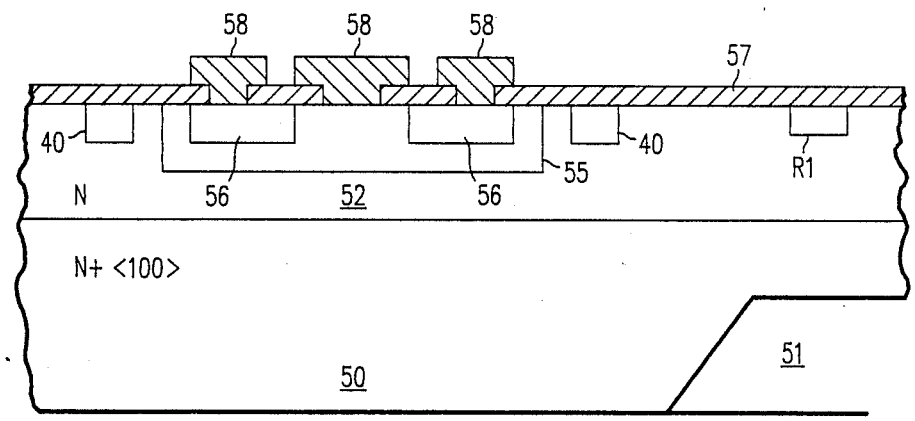
FIG. 5 shows a cross sectional view of the structure of FIG. 4.

As shown in cross section in FIG. 5, silicon substrate 50 has a <100> crystal orientation (as is well known for silicon sensors). Substrate 50 is preferably N+ type to minimize vertical parasitical transistor action during trim. The cross sectional view of FIG. 5 is taken along line 5—5 in FIG. 4. The portion of silicon substrate 50 and epitaxial layer 52 overlying cavity 51 is the silicon diaphragm. N type epitaxial layer 52 is grown on silicon substrate 50, thus forming a silicon body. The diaphragm thickness is adjusted for sensitivity.

A thicker (i.e., more difficult to bend) diaphragm is less sensitive than a thinner diaphragm. Often the epitaxial layer 52—substrate 50 junction is used as an etch stop to control diaphragm thickness, and sometimes the diaphragm is etched thinner than the epitaxial layer 52. A sensor can also be built without an epitaxial layer 52; the epitaxial layer 52 is an etch stop to control diaphragm thickness.

Then by conventional masking and diffusion methods, P type bridge resistor R1 and P type diode region 55 (corresponding to part of diode D3 in FIG. 3A) are formed in epitaxial layer 52. The trim resistors such as ΔR1 (not shown) are formed by the same diffusions and process steps as the bridge resistors such as R1 so as to have the same structure as the bridge resistor R1, but the trim and bridge resistors are not identical; for example the value of the trim resistor ΔR1 will typically be lower than that of the bridge resistor R1. The diode D3 of FIG. 4 also includes N+ diode regions 56 in FIG. 5. N+ diode regions 56 are formed in P type diode region 55 at the same time as N+ guard ring 40 is formed. N+ guard ring 40 may be formed in a separate diffusion from regions 56. Silicon dioxide insulating layer 57 is then formed on top of epitaxial layer 52. Contact openings for the resistors and diodes are formed in silicon dioxide layer 57. Then aluminum (or other suitable conductor) metallization 58 is formed over the top of silicon dioxide layer 57 and is patterned to form electrical contacts. The chip, which is one of many identical chips formed on a silicon wafer as is conventional in semiconductor processing, is then separated from the wafer. A conventional silox or nitride passivation may be used, but not over the sensitive diaphragm (i.e., over cavity 51). A suitable coating (not shown) of a material such as silicon gel is formed over the metallization 58 and silicon dioxide layer 57 as a protective coating. This completes fabrication of the pressure sensitive chip.

Thus in accordance with the preferred embodiment of the invention, the bridge resistors and trim resistors are of similar structure and thus have matching thermal coefficients.

It is possible to modify the invention, for instance, to have N type resistors in a P type epitaxial layer. The diode conductivity type would then be similarly reversed from that shown in FIG. 4. It would also be possible to form the structure shown in FIG. 4 on other than a <100> crystal orientation silicon substrate.

In summary, the present invention has the advantages over the prior art of being trimmable after final assembly of the sensor chip, of being cheaper to trim than are prior art sensors, and of being trimmable by simple applications of electricity, and so not requiring any special equipment.

The above description of the invention is illustrative and not limiting. Other embodiments incorporating the principles of this invention will be apparent to those skilled in the art.

I claim:

1. A silicon force sensor comprising:
   resistance means having an electrical resistance varying with the force applied to the sensor;
   a plurality of trim resistors each having a resistance trimmable by applied current pulses and being electrically connected to the resistance means; and
   a steering diode connected in parallel to a particular one of the trim resistors, so as to steer the current pulses applied to any of the other trim resistors around the particular one trim resistor.

2. The sensor of claim 1, wherein the resistance means is a Wheatstone bridge.

3. The sensor of claim 1, wherein the resistance means is a half bridge.

4. The sensor of claim 1, wherein the resistance means is a network of resistors.

5. The sensor of claim 4, wherein each trim resistor has the same structure as each resistor in the Wheatstone bridge.

6. The silicon sensor of claim 4, wherein:
   the sensor is formed on a silicon body having a <100> orientation;
   the silicon body partly overlies a cavity;
   the part of the silicon body overlying the cavity is a diaphragm of the sensor;
   the trim resistors and each resistor in the network of resistors includes a semiconductor region of a second conductivity type opposite the first conductivity type formed in the silicon body; and
   a metallization layer overlies the surface of the silicon body and electrically contacts the trim resistors and each resistor in the network of resistors.

7. The silicon sensor of claim 6, wherein the metallization layer includes aluminum.

8. The silicon sensor of claim 6, wherein the trim resistors and the resistors in the resistor network are of P conductivity type.

9. The silicon sensor of claim 6, wherein the silicon body comprises an epitaxial layer overlying a silicon substrate, and the trim resistors and each resistor in the network are formed in the epitaxial layer.

10. The sensor of claim 1, wherein the sensor is formed on a substrate of <100> orientation silicon.

11. A silicon force sensor comprising:
    a bridge including a plurality of bridge resistors, the bridge having an electrical resistance varying with the force applied to the sensor;
    at least one trim resistor, having a resistance trimmable by applied current pulses, and being electrically connected to the bridge; and
    a steering diode connected in parallel to one of the bridge resistors, so as to steer the current pulses applied to the trim resistor around said one bridge resistor.

12. A silicon force sensor comprising:
    a Wheatstone bridge including first, second, third and fourth bridge resistors;
    a first end of the first bridge resistor being connected to a first end of the second bridge resistor;
    a first end of the third ridge resistor being connected to a first end of the fourth bridge resistor;
    a first offset trim resistor trimmable by applied current pulses, having a first end connected to the second end of the first bridge resistor;
    a second offset trim resistor, trimmable by applied current pulses, having a first end connected to the second end of the second bridge resistor;
    a first terminal connected to the second end of the second offset trim resistor and also connected to the second end of the third bridge resistor;
    a second terminal connected to the first end of the first resistor;
    a third terminal connected to the second end of the first offset trim resistor and also to the second end of the fourth bridge resistor;
    a fourth terminal connected to the first end of the fourth bridge resistor;
    a first steering diode connected between the second terminal and the second end of the first bridge resistor; and
    a second steering diode connected between the second terminal and the first end of the second bridge resistor;
    whereby application of current pulses to the second terminal will trim the resistance of the first offset trim resistor, and application of current pulses to the first terminal will trim the resistance of the second offset trim resistor.

13. The silicon force sensor of claim 12, further comprising:
    a first sensitivity trim resistor, trimmable by applied current pulses, having a first end connected to the third terminal and a second end connected to the second end of the first offset trim resistor and also to the second end of the fourth bridge resistor;
    a second sensitivity trim resistor, trimmable by applied current pulses, having a first end connected to the first terminal and a second end connected to the second end of the second offset trim resistor and also connected to the second end of the third bridge resistor;
    a third steering diode connected between the fourth terminal and the second end of the first sensitivity trim resistor; and
    a fourth steering diode connected between the fourth terminal and the second end of the second sensitivity trim resistor;
    whereby application of current pulses to the fourth terminal will trim the resistance of the first sensitivity trim resistor, and application of current pulses to the first terminal will trim the resistance of the second sensitivity trim resistor.

14. The silicon sensor of claim 13, further comprising:
    a first balancing resistor having a first end connected to the second end of the second sensitivity trim resistor and a second end connected to the second end of the third bridge resistor; and
    a second balancing resistor having a first end connected to the second end of the first sensitivity trim resistor and a second end connected to the second end of the fourth bridge resistor.

15. The silicon sensor of claim 14, further comprising:
    a fifth steering diode connected at one end to the first end of the first sensitivity trim resistor, and connected at the second end to both the second end of the first offset trim resistor and the first end of the second balancing resistor; and
    a sixth steering diode connected at one end to the first end of the second sensitivity trim resistor, and connected at the second end to both the second end of the second offset trim resistor and the first end of the first balancing resistor;
    whereby separately forward biasing the first and second steering diodes allows current to pass through respectively the first and second offset trim resistors, for the purpose of trimming the resistance of the first and second offset trim resistors; and
    separately forward biasing the third and fourth steering diodes allows current to pass through respectively the first and second sensitivity trim resistors, for the purpose of trimming the resistance of the first and second sensitivity trim resistors.

16. The silicon sensor of claim 15, further comprising:
    a first current limiting resistor having a first end connected to the second end of the first sensitivity trim resistor, and a second end connected to both the second end of the first offset trim resistor and to the first end of the second balancing resistor; and
    a second current limiting resistor, having a first end connected to the second end of the second sensitivity trim resistor, and a second end connected to both the second end of the second offset trim resistor and to the first end of the first balancing resistor;
    whereby the first current limiting resistor limits the current passing through the fifth steering diode while trimming the first sensitivity trim resistor, and the second current limiting resistor limits the current passing through the sixth steering diode while trimming the second sensitivity trim resistor.

* * * * *

UNITED STATES PATENT AND TRADEMARK OFFICE
CERTIFICATE OF CORRECTION

PATENT NO.   :   4,945,762
DATED        :   August 7, 1990
INVENTOR(S)  :   Fred W. Adamic, Jr.

It is certified that error appears in the above-identified patent and that said Letters Patent is hereby corrected as shown below:

Column 7, line 28, Claim 12, "ridge" should read --bridge--.

Signed and Sealed this

Nineteenth Day of January, 1993

*Attest:*

DOUGLAS B. COMER

*Attesting Officer*        Acting Commissioner of Patents and Trademarks

UNITED STATES PATENT AND TRADEMARK OFFICE
CERTIFICATE OF CORRECTION

PATENT NO. : 4,945,762

DATED : August 7, 1990

INVENTOR(S) : Fred W. Adamic, Jr.

It is certified that error appears in the above-identified patent and that said Letters Patent is hereby corrected as shown below:

Column 1, line 66, "Zener" should read --zener--.

Signed and Sealed this

Sixth Day of July, 1993

Attest:

MICHAEL K. KIRK

*Attesting Officer*      *Acting Commissioner of Patents and Trademarks*